(12) United States Patent
Dawes et al.

(10) Patent No.: US 8,496,739 B2
(45) Date of Patent: Jul. 30, 2013

(54) ORGANIC ANTIOXIDANT BASED FILTRATION APPARATUS AND METHOD

(75) Inventors: Steven Bruce Dawes, Corning, NY (US); Benedict Yorke Johnson, Horseheads, NY (US); Wanda Janina Walczak, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 79 days.

(21) Appl. No.: 13/214,536

(22) Filed: Aug. 22, 2011

(65) Prior Publication Data

US 2012/0048110 A1   Mar. 1, 2012

Related U.S. Application Data

(60) Provisional application No. 61/378,051, filed on Aug. 30, 2010.

(51) Int. Cl.
*B01D 53/02* (2006.01)

(52) U.S. Cl.
USPC .................. 96/153; 96/154; 95/133; 95/134; 55/524

(58) Field of Classification Search
None
See application file for complete search history.

(56) References Cited

U.S. PATENT DOCUMENTS

| | | | |
|---|---|---|---|
| 3,755,161 A * | 8/1973 | Yokota et al. | 210/679 |
| 4,092,265 A * | 5/1978 | Longo et al. | 588/15 |
| 4,337,276 A * | 6/1982 | Nakamura et al. | 426/124 |
| 5,171,726 A * | 12/1992 | Takemura et al. | 502/170 |
| 5,348,755 A | 9/1994 | Roy | |
| 5,372,788 A * | 12/1994 | Kinoshita et al. | 422/122 |
| 5,422,062 A * | 6/1995 | Kinoshita et al. | 264/131 |
| 5,754,002 A | 5/1998 | Haitko et al. | |
| 6,024,899 A | 2/2000 | Peng et al. | |
| 6,136,749 A | 10/2000 | Gadkaree et al. | |
| 6,200,483 B1 | 3/2001 | Cutler et al. | |
| 6,248,691 B1 | 6/2001 | Gadkaree et al. | |
| 6,258,334 B1 | 7/2001 | Gadkaree et al. | |
| 6,425,941 B1 | 7/2002 | Roodman | |
| 6,478,858 B2 * | 11/2002 | Angermann et al. | 96/143 |
| 6,534,024 B2 | 3/2003 | Honjo et al. | |
| 6,652,627 B1 * | 11/2003 | Tonkovich et al. | 95/104 |
| 6,890,373 B2 * | 5/2005 | Nemoto et al. | 95/90 |
| 6,936,094 B2 * | 8/2005 | Minemura et al. | 96/154 |
| 6,962,617 B2 | 11/2005 | Simpson | |
| 7,033,419 B1 | 4/2006 | Granite et al. | |
| 7,048,781 B1 | 5/2006 | Lovell | |
| 2001/0007647 A1 | 7/2001 | Honjo et al. | |
| 2004/0045437 A1 * | 3/2004 | Chang et al. | 95/134 |
| 2007/0261557 A1 | 11/2007 | Gadkaree et al. | |
| 2009/0249954 A1 * | 10/2009 | Gadkaree et al. | 95/134 |
| 2009/0297762 A1 | 12/2009 | Gadkaree et al. | |
| 2009/0297885 A1 | 12/2009 | Gadkaree et al. | |
| 2010/0004119 A1 | 1/2010 | Gadkaree et al. | |

FOREIGN PATENT DOCUMENTS

| | | |
|---|---|---|
| GB | 1 336 241 | 11/1973 |
| JP | 54 033287 | 3/1979 |
| JP | 10 314581 | 12/1998 |
| WO | 03/051488 | 6/2003 |
| WO | 2004/080574 | 9/2004 |
| WO | 2007/133487 | 11/2007 |
| WO | 2007/133492 | 11/2007 |
| WO | 2007/133568 | 11/2007 |
| WO | 2009/108220 | 9/2009 |

OTHER PUBLICATIONS

Qiao et al., "Adsorption and Catalytic Oxidation of Gaseous Elemental Mercury in Flue Gas Over $MnO_x$/Alumina", Ind. Eng. Chem. Res. 2009, 48, 3317-3322.

Yan et al., "Bench-scale experimental evaluation of carbon performance on mercury vapour adsorption";, Fuel 83 (2004) 2401-2409.

Yan, "A Novel Process for Hg Removal From Gases", Ind. Eng. Chem. Res. 1994, 33, 3010-3014.

PCT Search Report and Written Opinion issued Dec. 20, 2011, Corresponding PCT Application No. PCT/US11/49124, filed on Aug. 25, 2011.

* cited by examiner

*Primary Examiner* — Christopher P Jones
(74) *Attorney, Agent, or Firm* — Joseph M. Homa

(57) ABSTRACT

A filter apparatus comprising an organic antioxidant. The filter apparatus may be use, for example, in the removal of a toxic metal from a fluid stream.

15 Claims, 2 Drawing Sheets

ORGANIC ANTIOXIDANT BASED FILTRATION APPARATUS AND METHOD

CROSS-REFERENCE TO RELATED APPLICATION

This application claims the benefit of priority under 35 U.S.C. §119 of U.S. Provisional Application Ser. No. 61/378,051, filed on Aug. 30, 2010, the content of which is relied upon and incorporated herein by reference in its entirety.

FIELD OF THE DISCLOSURE

This disclosure relates to the use of organic antioxidants, for example, in the removal of a toxic metal from a fluid stream.

BACKGROUND

The emission of toxic metals has become an environmental issue of increasing concern because of the dangers posed to human health. For instance, coal-fired power plants and medical waste incineration are major sources of human activity related to toxic metal emission into the atmosphere. However, emission control regulations have not been rigorously implemented for coal-fired power plants. A major reason is a lack of effective control technologies available at a reasonable cost.

A technology currently in use for controlling mercury emissions from coal-fired power plants is activated carbon injection (ACI). The ACI process involves injecting activated carbon powder into a flue gas stream and using a fabric filter or electrostatic precipitator to collect the activated carbon powder that has sorbed mercury. ACI technologies generally require a high C:Hg ratio to achieve the desired mercury removal level, which results in a high cost for sorbent material. The high C:Hg ratio indicates that ACI does not utilize the mercury sorption capacity of carbon powder efficiently.

An activated carbon packed bed can reach high mercury removal levels with more effective utilization of sorbent material. On the other hand, a typical powder or pellet packed bed has a very high pressure drop, which significantly reduces energy efficiency. Further, these fixed beds are generally an interruptive technology because they require frequent replacement of the sorbent material.

Flow-through substrates such as honeycombs may be used to achieve high removal levels of toxic metals from gas streams with lower pressure drop. Some gas streams, however, may contain agents that would inhibit the sorption of toxic metals on sorbents such as activated carbon honeycombs and other sorbent compositions and structures.

SUMMARY

Disclosed herein are new articles and methods that include organic antioxidants, useful for improving the toxic metal sorption performance of the sorbent materials. Embodiments disclosed herein relate to a filter apparatus comprising a support body and an organic antioxidant, wherein the organic antioxidant is present as a solid phase and the organic antioxidant is disposed on or incorporated within the support body. Also disclosed are methods for making such filter apparatus.

Also disclosed is a method of treating a fluid stream comprising a toxic metal, the method comprising: contacting a fluid stream with a filter apparatus comprising a support body and an organic antioxidant, wherein the organic antioxidant is present as a solid phase and the organic antioxidant is disposed on or incorporated within the support body, inhibiting oxidation of sulfur compounds in the fluid stream, and removing at least a portion of the toxic metal from the fluid stream.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
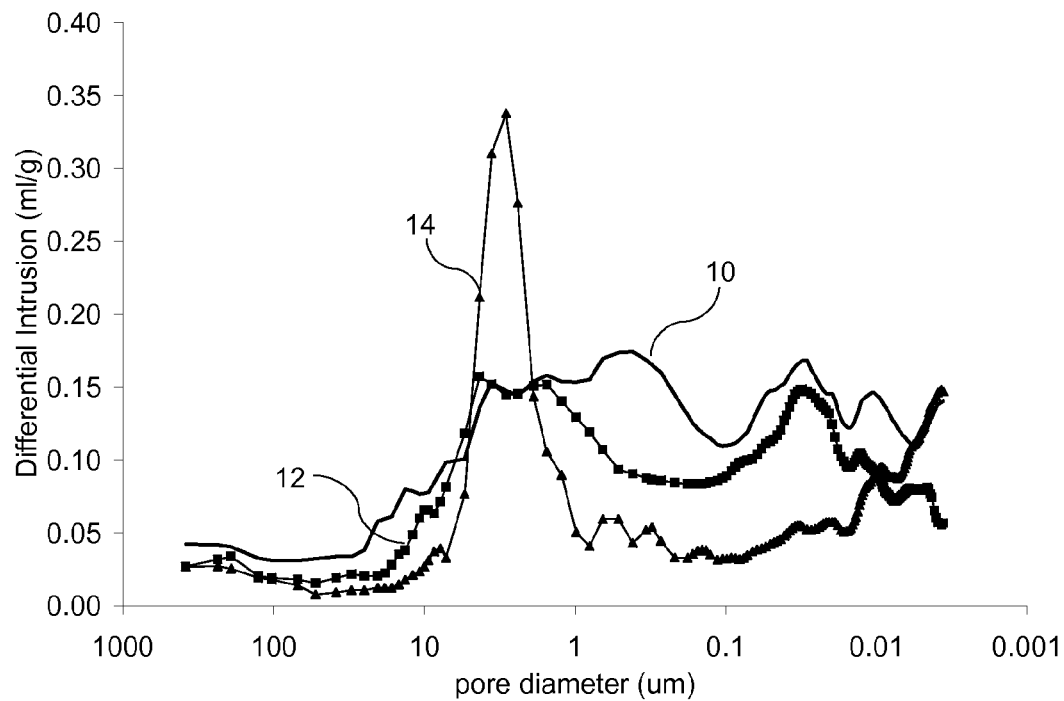
FIG. 1 is a graph showing porosity of various embodiments disclosed herein.

Embodiments disclosed herein comprise a filter apparatus comprising a support body and an organic antioxidant, wherein the organic antioxidant is present as a solid phase and the organic antioxidant is disposed on or incorporated within the support body.

The support body may be non-porous, or porous with an appropriate level of porosity. Exemplary support bodies in any of the embodiments disclosed herein comprise support bodies comprising glass, glass-ceramic, ceramic, inorganic cement, metal, activated carbon, or polymer, including combinations thereof. Some example support body materials include cordierite, mullite, clay, magnesia, metal oxides, talc, zircon, zirconia, zirconates, zirconia-spinel, magnesium alumino-silicates, spinel, zeolite, alumina, silica, silicates, borides, alumina-titanate, alumino-silicates (e.g. porcelains), lithium aluminosilicates, alumina silica, feldspar, titania, fused silica, nitrides (e.g. silicon nitride), borides, carbides (e.g. silicon carbide), silicon nitride, metal carbonates, metal phosphates, wherein the metal can be, for example, Ca, Mg, Al, B, Fe, Ti, Zn, or combinations of these.

Exemplary support bodies in any of the embodiments disclosed herein may also comprise polymer substrates. The polymer substrates may be linear or cross-linked and may comprise, for example, organic polymers, such as epoxies, polyamides, polyimides, or phenolic resins, or silicone polymers, such as methyl or phenyl silicones, and combinations thereof.

In some embodiments, the support body is honeycomb shaped comprising an inlet end, an outlet end, and inner channels extending from the inlet end to the outlet end. In some embodiments, the honeycomb shaped support body comprises a multiplicity of cells extending from the inlet end to the outlet end, the cells being defined by intersecting cell walls. The honeycomb shaped support body could optionally comprise one or more selectively plugged cell ends to provide a wall flow-through structure that allows for more intimate contact between the fluid stream and cell walls.

Exemplary support bodies of any embodiments may be made by extrusion, compression, injection molding, and casting. A support body may be made, for example, by preparing a batch mixture, extruding the mixture through a die forming a honeycomb shape, drying, and optionally firing the support body.

In some exemplary embodiments, a support body comprising activated carbon may be made by providing a batch composition comprising activated carbon particles and an organic or inorganic binder, shaping the batch composition, and optionally heat treating the support body. In other exemplary embodiments, a support body comprising activated carbon may be made by providing a batch composition comprising a carbon precursor, shaping the batch composition, optionally curing the composition, carbonizing the composition, and activating the carbonized composition.

Carbon precursors comprise synthetic carbon-containing polymeric material, organic resins, charcoal powder, coal tar pitch, petroleum pitch, wood flour, cellulose and derivatives thereof, natural organic materials such as wheat flour, wood flour, corn flour, nut-shell flour, starch, coke, coal, or mixtures or combinations of any two or more of these.

In some embodiments, the batch composition comprises an organic resin as a carbon precursor. Exemplary organic resins include thermosetting resins and thermoplastic resins (e.g., polyvinylidene chloride, polyvinyl chloride, polyvinyl alcohol, and the like). Synthetic polymeric material may be used, such as phenolic resins or a furfural alcohol based resin such as furan resins. Exemplary suitable phenolic resins are resole resins such as plyophen resins. An exemplary suitable furan liquid resin is Furcab-LP from QO Chemicals Inc., IN, U.S.A. An exemplary solid resin is solid phenolic resin or novolak.

The batch compositions may optionally also comprise inert inorganic fillers, (carbonizable or non-carbonizable) organic fillers, and/or binders. Inorganic fillers can include oxide glass; oxide ceramics; or other refractory materials. Exemplary inorganic fillers that can be used include oxygen-containing minerals or salts thereof, such as clays, zeolites, talc, etc., carbonates, such as calcium carbonate, alumninosilicates such as kaolin (an aluminosilicate clay), flyash (an aluminosilicate ash obtained after coal firing in power plants), silicates, e.g., wollastonite (calcium metasilicate), titanates, zirconates, zirconia, zirconia spinel, magnesium aluminum silicates, mullite, alumina, alumina trihydrate, boehmite, spinel, feldspar, attapulgites, and aluminosilicate fibers, cordierite powder, mullite, cordierite, silica, alumina, other oxide glass, other oxide ceramics, or other refractory material.

Additional fillers such as fugitive filler which may be burned off during carbonization to leave porosity behind or which may be leached out of the formed support bodies to leave porosity behind, may be used. Examples of such fillers include polymeric beads, waxes, starch, natural or synthetic materials of various varieties known in the art.

Exemplary organic binders include cellulose compounds. Cellulose compounds include cellulose ethers, such as methylcellulose, ethylhydroxy ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. An example methylcellulose binder is METHOCEL™ A, sold by the Dow Chemical Company. Example hydroxypropyl methylcellulose binders include METHOCEL™ E, F, J, K, also sold by the Dow Chemical Company. Binders in the METHOCEL™ 310 Series, also sold by the Dow Chemical Company, can also be used in the context of the invention. METHOCEL™ A4M is an example binder for use with a RAM extruder. METHOCEL™ F240C is an example binder for use with a twin screw extruder.

The batch composition may also optionally comprise forming aids. Exemplary forming aids include soaps, fatty acids, such as oleic, linoleic acid, sodium stearate, etc., polyoxyethylene stearate, etc. and combinations thereof. Other additives that can be useful for improving the extrusion and curing characteristics of the batch are phosphoric acid and oil. Exemplary oils include petroleum oils with molecular weights from about 250 to 1000, containing paraffinic and/or aromatic and/or alicyclic compounds. Some useful oils are 3 in 1 oil from 3M Co., or 3 in 1 household oil from Reckitt and Coleman Inc., Wayne, N.J. Other useful oils can include synthetic oils based on poly (alpha olefins), esters, polyalkylene glycols, polybutenes, silicones, polyphenyl ether, CTFE oils, and other commercially available oils. Vegetable oils such as sunflower oil, sesame oil, peanut oil, soyabean oil etc. may also be useful.

After shaping a support body from the batch composition, such as one comprising a curable organic resin, the support body may optionally be cured under appropriate conditions. Curing can be performed, for example, in air at atmospheric pressures and typically by heating the composition at a temperature of from 70° C. to 200° C. for about 0.5 to about 5.0 hours. In some embodiments, the support body is heated from a low temperature to a higher temperature in stages, for example, from 70° C., to 90° C., to 125° C., to 150° C., each temperature being held for a period of time. Additionally, curing may also be accomplished by adding a curing additive such as an acid additive at room temperature.

The cured support body can then be subjected to a carbonization step. For instance, the cured support body may be carbonized by subjecting the cured support body to an elevated carbonizing temperature in an $O_2$-depleted atmosphere. The carbonization temperature can range from 600 to 1200° C., in some embodiments from 700 to 1000° C. The carbonizing atmosphere can be inert, comprising mainly a non reactive gas, such as $N_2$, Ne, Ar, mixtures thereof, and the like. At the carbonizing temperature in an $O_2$-depleted atmosphere, the organic substances contained in the cured support body decompose to leave a carbonaceous residue.

The carbonized support body may then be activated. The carbonized support body may be activated, for example, in a gaseous atmosphere selected from $CO_2$, $H_2O$, a mixture of $CO_2$ and $H_2O$, a mixture of $CO_2$ and nitrogen, a mixture of $H_2O$ and nitrogen, and a mixture of $CO_2$ and another inert gas, for example, at an elevated activating temperature in a $CO_2$ and/or $H_2O$-containing atmosphere. The atmosphere may be essentially pure $CO_2$ or $H_2O$ (steam), a mixture of $CO_2$ and $H_2O$, or a combination of $CO_2$ and/or $H_2O$ with an inert gas such as nitrogen and/or argon. Utilizing a combination of nitrogen and $CO_2$, for example, may result in cost savings. A $CO_2$ and nitrogen mixture may be used, for example, with $CO_2$ content as low as 2% or more. Typically a mixture of $CO_2$ and nitrogen with a $CO_2$ content of 5-50% may be used to reduce process costs. The activating temperature can range from 600° C. to 1000° C., in certain embodiments from 600° C. to 900° C. During this step, part of the carbonaceous structure of the carbonized support body is mildly oxidized:

$$CO_2\ (g) + C\ (s) \rightarrow 2CO\ (g),$$

$$H_2O\ (g) + C\ (s) \rightarrow H_2\ (g) + CO\ (g),$$

resulting in the etching of the structure of the carbonaceous support body and formation of an activated carbon matrix that can define a plurality of pores on a nanoscale and microscale. The activating conditions (time, temperature, and atmosphere) can be adjusted to produce the final product with the desired specific area.

The support body may also comprise a reactive compound, for example, sulfur or metal reactive compound, which promotes additional capacity for the sorption of a toxic metal onto the support body. The reactive compound may be present in a batch mixture used to form the support body, or may be coated onto the support body using, for example, a washcoating technique.

Sulfur or metal reactive compound may optionally be included in (including within the walls of) the support body by the addition of sulfur or metal reactive compound in the batch mixture and/or by applying sulfur or metal reactive compound to the support body after it has been formed. For example, sulfur or metal reactive compound may be added to the support body after the support body has been formed by dipping the support body in a composition comprising sulfur or metal reactive compound or spraying a composition comprising sulfur or metal reactive compound on the support body.

Sulfur or metal reactive compound may optionally be included in the support body by the addition of sulfur or metal reactive compound in the batch composition or by applying sulfur or metal reactive compound to the support body after it has been formed, cured, carbonized, or activated.

The term "sulfur" includes both elemental sulfur and sulfur in any oxidation state, including chemical compounds and compositions that comprise sulfur. The sulfur may include elemental sulfur (0), sulfate (+6), sulfite (+4), and sulfide (−2). This includes sulfur powder, sulfur-containing powdered resin, sulfides, sulfates, and other sulfur-containing compounds, and mixtures or combination of any two or more of these. Exemplary sulfur-containing compounds include hydrogen sulfide and/or its salts, carbon disulfide, sulfur dioxide, thiophene, sulfur anhydride, sulfur halides, sulfuric ester, sulfurous acid, sulfacid, sulfatol, sulfamic acid, sulfan, sulfanes, sulfuric acid and its salts, sulfite, sulfoacid, sulfobenzide, sulfur containing organosilanes and mixtures thereof.

In embodiments that comprise a metal reactive compound added to the batch composition, the metal reactive compound may be any source of metal reactive compound in elemental or oxidized state. According to certain embodiments, the metal reactive compound is provided from a source material selected from: (i) halides and oxides of alkali and alkaline earth metals; (ii) precious metals and compounds thereof; (iii) oxides, sulfides, and salts of vanadium, chromium, manganese, iron, cobalt, nickel, copper, zinc, niobium, molybdenum, silver, tungsten and lanthanoids; or (iv) combinations and mixtures of two or more of (i), (ii) and (iii). According to certain embodiments of the process, the metal reactive compound-source material is in a form selected from: (i) oxides, sulfides, sulfates, acetates and salts of manganese; (ii) oxides, sulfides and salts of iron; (iii) combinations of (i) and potassium iodide (KI); (iv) combinations of (ii) and KI; and/or (v) mixtures and combinations of any two or more of (i), (ii), (iii) and (iv). When the reactive compound to be used is soluble, a solution of the metal reactive compound may be added to the batch. In embodiments that comprise an insoluble compound to be added, then a finely ground powder may be added to the batch.

In some embodiments, the support body is essentially free of sulfur. In some of those embodiments, the support body comprises no sulfur. In other of those embodiments, the support body comprises less than 1%, less than 0.5%, or less than 0.1% by weight of sulfur, calculated on the basis of sulfur atoms in the case of sulfur-containing compounds.

In some embodiments, the support body comprises a sorbent material. The sorbent material may comprise, for example, solid materials such as ceramic and/or organic materials. Ceramic materials include, but are not limited to, those comprising cordierite and silicon carbide. Organic materials include, but are not limited to, synthetic carbon-containing polymeric material (which may be cured or uncured); activated carbon such as activated carbon powder; charcoal powder; coal tar pitch; petroleum pitch; wood flour; cellulose and derivatives thereof; natural organic materials, such as wheat flour, wood flour, corn flour, nut-shell flour; starch; coke; coal; or mixtures thereof. In some embodiments, the organic material comprises a resin such as, but not limited to, phenolic resin, acrylic resin, or a resin based on furfuryl alcohol. In some embodiments, the sorbent material may comprise activated carbon, for example, activated carbon resulting from the carbonization and activation of any organic material mentioned above.

In some embodiments, the support body is formed from the sorbent material or the sorbent material may be coated, or otherwise disposed, on a support body and/or structure such as a glass, glass-ceramic, ceramic, or metal structure.

In some embodiments, the sorbent material and/or activated carbon is in the form of a flow-through substrate or is coated onto or otherwise disposed on a support body, the support body being in the form of a flow-through substrate. The term "flow-through substrate" as used herein means a shaped body comprising inner passageways, such as straight or serpentine channels and/or porous networks that would permit the flow of a gas stream through the structure. The flow-through substrate comprises a dimension in the flow-through direction of at least 1 cm, at least 2 cm, at least 3 cm, at least 4 cm, at least 5 cm, at least 6 cm at least 7 cm, at least 8 cm, at least 9 cm, or at least 10 cm from the inlet to the outlet.

In some embodiments, the support body comprises a layer of sorbent material coated on the support body. For example, the support body comprises an activated carbon layer coated on the support body. The term "layer" as used herein means that activated carbon is disposed on an exposed surface of the support body. The layer may coat all or a portion of the surface of the support body, and may impregnate the support body to some extent if the surface of the support body is porous. For instance, the layer may coat the inner pore and/or channel surfaces of the support body and/or other outer surfaces of the support body. In some embodiments, the activated carbon is in the form of an uninterrupted and continuous layer over all or a portion of the surface of the support body. In other embodiments, the layer of activated carbon includes cracks, pinholes, or any other discontinuities. The layer may further comprise other suitable materials in addition to the activated carbon. In some embodiments, an organic antioxidant is present as an organic antioxidant layer and the activated carbon layer is sandwiched between the organic antioxidant layer and the support body.

In some embodiments, at least a portion of the sorbent material and/or activated carbon is chemically bound to at least a portion of support body. The term "at least a portion" in this and other contexts refers to some or all of the material being described. Thus, in these embodiments, some or all of the sorbent material and/or activated carbon can be chemically bound to some or all of the support body.

In some embodiments, the sorbent material and/or activated carbon is distributed homogeneously throughout the support body, such as when included in the batch mixture.

Some embodiments disclosed herein comprise activated carbon comprising pore sizes from 0.001 microns to 100 microns. In some embodiments, at least 50%, at least 60%, at least 70%, or at least 80% of the pores in the activated carbon have diameters within the range of 0.01 microns to 1.0 microns. In some embodiments, at least 10%, at least 15%, or at least 20% of the pores in the activated carbon have diameters within the range of 5.0 microns to 50 microns. In some embodiments, the activated carbon comprises micropores, mesopores, and macropores. As defined herein, micropores have a pore diameter of 2 nanometers or less, mesopores have pore diameters ranging from 2 to 50 nanometers, and macropores have a pore diameter greater than 50 nanometers. Exemplary activated carbons include those disclosed in U.S. Pat. Nos. 6,024,899 and 6,248,691, the contents of both being incorporated by reference herein.

In some embodiments, the organic antioxidant is selected from ascorbic acid, glutathione, sodium ascorbate, calcium ascorbate, trans stilbene oxide, tetrakis-(methylene-(3,5-di-(tert)-butyl-4-hydrocinnamate))methane, octadecyl 3,5-Di-(tert)-butyl-4-hydroxyhydrocinnamatelimonene, citrus oils, tocopherol, or combinations thereof. In some embodiments, the organic antioxidant may comprise 2 or more organic antioxidants. In some embodiments, the organic antioxidant is ascorbic acid. In some embodiments, the organic antioxidant is ascorbic acid and glutathione.

In some embodiments, the organic antioxidant is present as a layer. For example, the support body is coated with a layer that comprises an organic antioxidant. The term "layer" as used herein means that antioxidant is disposed on an exposed surface of the support body. The layer may coat all or a portion of the surface of the support body, and may impregnate the substrate to some extent, for example in embodiments that comprise a substrate with a porous surface. For instance, the layer may coat the inner pore and/or channel surfaces of a support body and/or other outer surfaces of the support body. In some embodiments, the antioxidant is in the form of an uninterrupted and continuous layer over all or a portion of the surface of the support body. In other embodiments, the layer of organic antioxidant includes cracks, pinholes, or any other discontinuities. The layer may further comprise other suitable materials in addition to the organic antioxidant.

In some embodiments, at least a portion of the antioxidant is mechanically bound to at least a portion of support body. The term "at least a portion" in this and other contexts refers to some or all of the material being described. Thus, in these embodiments, some or all of the antioxidant can be mechanically bound to some or all of the support body.

In some embodiments, the organic antioxidant is distributed homogeneously throughout the support body, such as when included in the batch mixture.

In some embodiments, for example when the organic antioxidant is present as a layer, the organic antioxidant may comprise from 0.1% to 50% by weight of the uncoated support. In some embodiments, the organic antioxidant may comprise from 5% to 50%, 5% to 40%, 5% to 30%, 10% to 50%, 10% to 40%, 10% to 30%, 20% to 50%, 20% to 40%, 20% to 30%, 30% to 50%, or 40% to 50% by weight of the uncoated support body. In some embodiments, for example when organic antioxidant is included in the batch mixture, the organic antioxidant constitutes from 0.1% to 50% by weight of the filter apparatus.

In some embodiments, the organic antioxidant may be disposed on, or incorporated within, a support body. In some embodiments, the organic antioxidant may be disposed on, or incorporated within, a support body comprising a sorbent material. In this instance, the toxic metal may be sorbed on the sorbent essentially simultaneously with the contacting of the fluid stream with the organic antioxidant.

In some embodiments, the organic antioxidant is disposed on, or incorporated within, a second support body within the filter apparatus. For example, the filter apparatus may comprise a first support body comprising a sorbent material, such as activated carbon, and a second support body comprising an organic antioxidant. In these instances, a toxic metal can be sorbed on the sorbent material after a fluid stream is contacted with the organic antioxidant, such as when the organic antioxidant is disposed on, or incorporated within, the second support body that is upstream of the sorbent material.

Embodiments disclosed herein include a method of making a filter apparatus comprising a support body and an organic antioxidant, wherein the organic antioxidant is present as a solid phase and the organic antioxidant is disposed on or incorporated within the support body; the method comprising applying an organic antioxidant to a support body by coating under vacuum, dipping, or spraying.

The support body can be coated with an organic antioxidant, for example, by applying a coating comprising a solution of an organic antioxidant to the support body. As examples, the organic antioxidant can be applied by dipping the support body in a solution comprising the organic antioxidant or spraying a solution comprising the organic antioxidant on the support body. The organic antioxidant may also be applied by coating under vacuum.

A suitable solvent is selected to prepare the solution comprising an organic antioxidant, such that the organic antioxidant is soluble in the solvent. For example, water may be used as a solvent to prepare the solution comprising an organic antioxidant. In some embodiments, the solution comprising an organic antioxidant is a supersaturated solution.

The eventual quantity of organic antioxidant layer formed on the support body is dependent on the amount of organic antioxidant that is retained by the support body. The amount of organic antioxidant retained by the support body may be increased, for example, by increasing the contact time of the support body with the solution comprising an organic antioxidant. Contacting the support body with the solution comprising an organic antioxidant more than once and allowing the support body to dry between contacting steps may also increase the amount of organic antioxidant retained by the support body. In addition, the amount of organic antioxidant retained by the support body can be controlled by simply modifying the overall porosity of the support body (e.g., increasing porosity will increase the amount of organic antioxidant retained by the support body). In some embodiments, at least 30% of the original surface area (measured in $m^2/g$) and pore volume (measured in $cm^3/g$) be retained after application of the organic antioxidant.

In some embodiments, the method of applying an organic antioxidant to a support body is selected such that the pore structure of the support body is not substantially changed by the organic antioxidant. Generally, it is advantageous to achieve a maximum amount of organic antioxidant without reducing the ability of the support body to capture a toxic metal. For example, the amount of organic antioxidant applied to the support body preferably should not "plug" or fill in the pores of the support body. In some embodiments, the filter apparatus comprises surfaces comprising micropores, mesopores, and macropores. For example, after applying the organic antioxidant to the support body, the surfaces of the filter apparatus retain micropores, mesopores, and macropores.

FIG. 1 shows porosity data, as measured using mercury porosimetry, for example embodiments of an activated carbon honeycomb (control) 10, an activated carbon honeycomb having a layer of ascorbic acid 12, and an activated carbon honeycomb having a layer of tetrakis methane 14. As shown in FIG. 1, the tetrakis methane layer appears to reduce the volume of available pores in the 0.01 micron to 1 micron diameter range, as well as the greater than 7 micron diameter range, more than the ascorbic acid layer. The size of the tetrakis methane molecules may be a factor in this volume reduction. For the embodiments shown in FIG. 1, the tetrakis methane sample exhibited the lowest efficiency of mercury removal from a simulated flue gas, while the ascorbic acid showed the highest level of efficiency of mercury removal from a simulated flue gas. This example demonstrates the advantages of retaining a pore size distribution in the support body after application of organic antioxidant that is similar across the range of pore sizes from 0.01 to 50 microns. In some embodiments, the differential pore volume after application of organic antioxidant remains within at least 30% of the original activated carbon at each pore size from 0.01 to 50 microns. Generally, it is advantageous that the choice of organic antioxidant and organic antioxidant application does not result in creation of new pores on the support body. This phenomenon is shown, for example, in the tetrakis methane curve 14 in FIG. 1.

Figure 2:
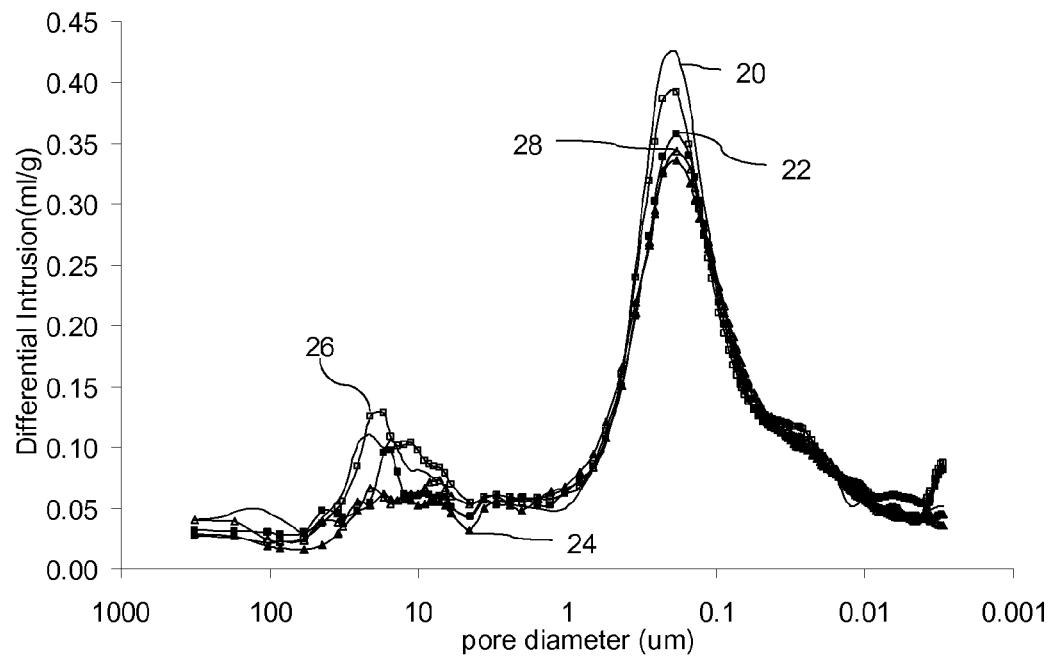
FIG. 2 is a graph showing the effect of contact time on porosity of various embodiments disclosed herein.

FIG. 2 shows the effect of contact time on pore diameter for example embodiments. Pore diameters of an activated carbon honeycomb control 20 are shown as a solid line. Pore diameters for an activated carbon honeycomb contacted with a solution comprising ascorbic acid for 1.5 hours 22 are represented as solid squares. The solid triangles represent pore diameters for an activated carbon honeycomb contacted with a solution comprising ascorbic acid for 3 hours 24. Also represented are pore diameters for activated carbon honeycombs contacted with solutions comprising ascorbic acid with EDTA, for 1.5 hours 26 (open squares) and 3 hours 28 (open triangles). Increased contact time is shown to decrease the volume of pores in some ranges, for example, greater than 6 micron pore diameters, and 0.1 micron to 0.3 microns.

Some embodiments further comprise drying the support body; wherein after drying the organic antioxidant is present in an amount from 0.1% to 50% by weight of the support body, for example, from 5% to 50%, 5% to 40%, 5% to 30%, 10% to 50%, 10% to 40%, 10% to 30%, 20% to 50%, 20% to 40%, 20% to 30%, 30% to 50%, or 40% to 50% by weight of the uncoated support body. After applying the organic antioxidant solution to the support body, the support body is dried to allow the solvent to evaporate, leaving a layer of organic antioxidant on the support body. The support body may be allowed to dry in ambient air at room temperature or may be dried at an elevated temperature not to exceed the melting point of the organic antioxidant, for example, in and oven. In some embodiments, little or no weight change in the support body with organic antioxidant after 24 hours at room temperature signals an acceptable drying time.

Embodiments disclosed herein include a method of treating a fluid stream comprising a toxic metal, the method comprising contacting a fluid stream with a filter apparatus comprising a support body and an organic antioxidant; wherein the organic antioxidant is present as a solid phase and the organic antioxidant is disposed on or incorporated within the support body; inhibiting oxidation of sulfur compounds in the fluid stream; and removing at least a portion of the toxic metal from the fluid stream.

Embodiments of support bodies, such as honeycomb shaped support bodies, may be used, for example, for the sorption of a toxic metal from a fluid through contact with the fluid. For example, a fluid stream may be passed through inner passageways of a support body from the inlet end to the outlet end. The fluid stream may be in the form of a gas or a liquid. The gas or liquid may also contain another phase, such as a solid particulate in either a gas or liquid stream, or droplets of liquid in a gas stream. Example gas streams include coal combustion flue gases (such as from bituminous and sub-bituminous coal types or lignite coal) and syngas streams produced in a coal gasification process.

In some embodiments, the temperature of the fluid stream is in the range of from 100° C. to 300° C.

In embodiments disclosed herein, an organic antioxidant acts to inhibit oxidation of sulfur compounds, for example $SO_2$, in a fluid stream. When sulfur compounds such as $SO_2$ are oxidized, sulfuric acid can be formed. The presence of sulfuric acid may reduce to some degree, or entirely prevent, the sorption of a toxic metal on a sorbent material compared to the absence of the sulfuric acid in the gas stream. For example, the sulfuric acid may reduce sorption of the toxic metal by reducing the capacity of the sorbent material, by reducing the capture efficiency of the sorbent material, by reducing the rate of toxic metal capture by the sorbent, or by a combination of these effects. The sulfuric acid may reduce the sorption of a toxic metal on the sorbent through physical and/or chemical mechanisms. For example, the sulfuric acid may physically occupy or otherwise block access to pore sites on the sorbent material. Alternatively, or in addition, the sulfuric acid may detrimentally chemically react with the sorbent material.

The term "inhibit" as used herein refers to reducing to some degree, or entirely preventing, the detrimental effect of oxidizing sulfur compounds on the sorption of a toxic metal on a sorbent. The organic antioxidant may achieve this through any mechanism, such as by physical and/or chemical mechanisms. For example, the organic antioxidant may chemically react with the sulfur compounds, may catalyze or otherwise contribute to a chemical change in the sulfur compounds, may reduce the amount of the sulfur compounds in the gas stream, may chemically or physically capture the sulfur compounds, or may act through a combination of these effects.

In some embodiments, the organic antioxidant may be disposed on, or incorporated within, a support body. In some embodiments, the organic antioxidant may be disposed on, or incorporated within, a support body comprising a sorbent material. In that instance, a toxic metal may be sorbed on the sorbent material essentially simultaneously with the contacting of the sulfur compounds with the organic antioxidant.

In some embodiments, the organic antioxidant is disposed on, or incorporated within, a second support body within the filter apparatus. In these instances, a toxic metal may be sorbed on the first support body and/or sorbent material after the sulfur compound is contacted with the organic antioxidant, such as when the organic antioxidant is disposed on, or incorporated within, a second support body that is upstream of the first support body and/or sorbent material.

In some embodiments, the organic antioxidant may act as a sorbent for a toxic metal. For example, the toxic metal may be sorbed on the organic antioxidant.

The terms "remove," "removal," and "removing" used to describe the removal of a toxic metal from the fluid stream refer to reducing the content of the toxic metal in the fluid stream to any extent. Thus, removal of a toxic metal from a fluid stream includes removing, for example, at least 50%, at least 60%, at least 70%, at least 80%, at least 90%, or at least 95% of the toxic metal from the fluid stream, or removing 100% of the toxic metal from the fluid stream.

In embodiments disclosed herein the at least a portion of the toxic metal is removed from the fluid stream via sorption. The term "at least a portion" in this and other contexts refers to some or all of the material being described. Thus in these embodiments, some or all of the toxic metal may be removed from the fluid stream. The terms "sorb," "sorption," and "sorbed," refer to the adsorption, sorption, or other entrapment of the toxic metal on the support body, either physically, chemically, or both physically and chemically.

Toxic metals to be removed include, for instance, toxic metals at 3 wt % or less within the fluid stream, for example at 2 wt % or less, or 1 wt % or less. Toxic metals may also include, for instance, toxic metals at 10,000 $\mu g/m^3$ or less within the fluid stream. The term "toxic metal" and any reference to a particular metal by name herein includes the elemental forms as well as oxidation states of the metal. Removal of a toxic metal thus includes removal of the elemental form of the metal as well as removal of any organic or inorganic compound or composition comprising the metal.

Example toxic metals that can be sorbed include cadmium, mercury, chromium, lead, barium, beryllium, arsenic, selenium, and chemical compounds or compositions comprising those elements. For example, the metal mercury may be in an elemental ($Hg^\circ$) or oxidized state ($Hg^+$ or $Hg^{2+}$). Example forms of oxidized mercury include HgO and halogenated mercury, for example $Hg_2Cl_2$ and $HgCl_2$.

In various embodiments of the present disclosure, the filter apparatus disclosed herein are capable of removing at least one toxic metal from a fluid stream. In some embodiments, the toxic metal is mercury.

The toxic metal may be in any phase that can be sorbed on the support body and/or sorbent material. Thus, the toxic metal may be present, for example, as a liquid in a gas fluid steam, or as a liquid in a liquid fluid stream. The toxic metal could alternatively be present as a gas phase contaminant in a gas or liquid fluid stream.

Various embodiments will be further clarified by the following examples.

EXAMPLES

Activated carbon was prepared as described here. 31.6 wt % charcoal was mixed with 18 wt % BH200, 5.6% wt % methocel, 1 wt % LIGA Vegetable oil and 41.3 wt %% NC phenolic resin on a 700 g total weight scale. The mixture was extruded at room temperature using a ram extruder, carbonized under flowing N2 conditions and activated under flowing $CO_2$ conditions. Specific conditions for carbonization were: heating ramp rate=2 C/min, $N_2$ flow rate=100 scfh, soak temperature=840 C, soak time=2 hours, and cooling Rate=–3 C/min. Average shrinkage was 13.4% and burn off after carbonization was 46.5%.

Specific conditions used for activation were: 2 C/min ramp up with 100 scfh $N_2$ to 800 C, 2 hours at 800 C using 3 cfh $CO_2$ flow rate. The honeycomb was flipped midway through the $CO_2$ run when approximate halfway burn off was achieved, followed by a 3 C/min ramp down with 100 scfh $N_2$ to room temperature.

After activation, the honeycomb was dipped in a supersaturated solution of ascorbic acid (Sigma Aldrich Catalog #A5960) in water at room temperature for a period of time that varied between 1 minute and 3 hours to optimize coating conditions. After dipping the honeycomb was removed and dried in air for 2 days before testing for mercury capture performance. The amount of weight gain recorded after 2 days drying in air was between 15% (1 minute ascorbic acid dip) and 30% (3 hour ascorbic acid dip). For the ascorbic acid treated sample 12 in FIG. 1, the recorded weight gain was about 30% after 2 days of drying.

Figure 3:
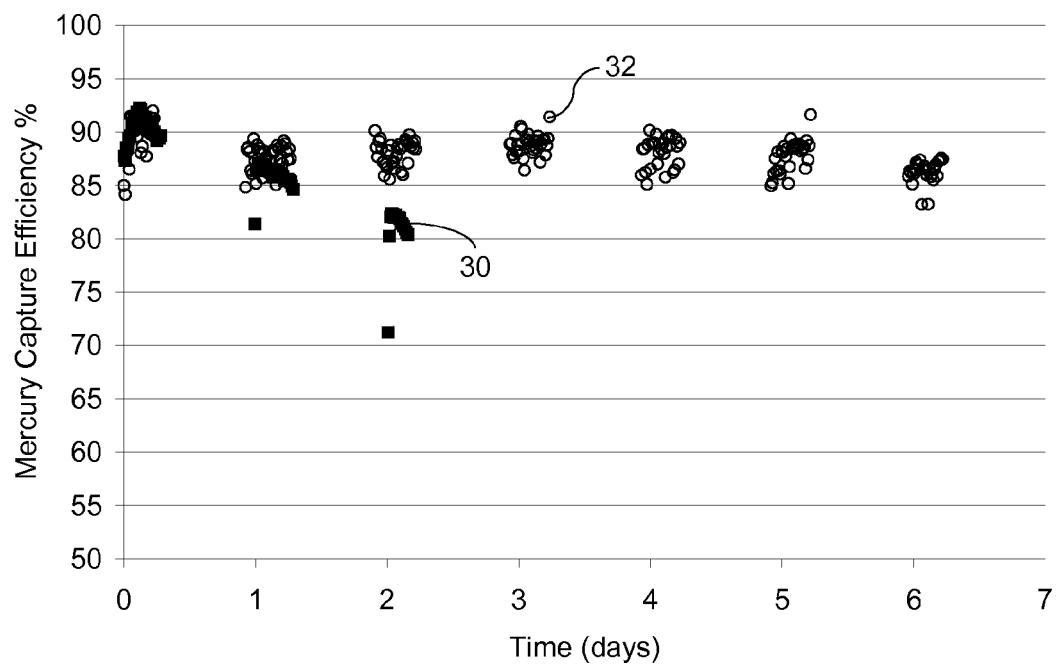
FIG. 3 is a graph showing mercury capture efficiency of an embodiment disclosed herein and a control.

Mercury capture performance on activated carbon control and activated carbon treated with ascorbic acid were tested using simulated flue gas conditions ($SO_2$ 400 ppm, HCl 3 ppm, NO 300 ppm, $NO_2$ 20 ppm). The mercury capture efficiency of both samples is shown in FIG. 3. The activated carbon control 30 (no ascorbic acid) ceases to effectively capture mercury (less than 85% efficiency) in a matter of 2 days. The ascorbic acid treated activated carbon 32 captures mercury at 85% to 90% efficiency for at least as long as the test was run (7 days).

It should be understood that while the invention has been described in detail with respect to certain illustrative embodiments thereof, it should not be considered limited to such, as numerous modifications are possible without departing from the broad spirit and scope of the invention as defined in the appended claims.

Unless otherwise indicated, all numbers used on the specification and claims are to be understood as being modified in all instances by the term "about", whether or not so stated. It should also be understood that the precise numerical values used on the specification and claims form additional embodiments of the invention.

What is claimed is:

1. A filter apparatus comprising:
   a honeycomb shaped support body;
   an activated carbon layer on the support body; and
   an organic antioxidant;
      wherein the organic antioxidant is present as a solid phase,
      wherein the organic antioxidant is present as an organic antioxidant layer and the activated carbon layer is sandwiched between the organic antioxidant layer and the support body, and
      wherein the organic antioxidant is selected from ascorbic acid, glutathione, sodium ascorbate, calcium ascorbate, trans stilbene oxide, tetrakis-(methylene-(3,5-di-(tert)-butyl-4-hydrocinnamate))methane, octadecyl 3,5-Di-(tert)-butyl-4-hydroxyhydrocinnamatelimonene, citrus oils, tocopherol, or combinations thereof.

2. The filter apparatus of claim 1, wherein the support body comprises a sorbent material.

3. The filter apparatus of claim 1, wherein the support body comprises activated carbon.

4. The filter apparatus of claim 1, wherein the activated carbon comprises pores having pore diameter sizes from 0.001 microns to 100 microns.

5. The filter apparatus of claim 1, wherein the activated carbon comprises micropores, mesopores and macropores.

6. The filter apparatus of claim 1, wherein the filter apparatus comprises surfaces having pores and the pore diameter sizes from 0.001 microns to 100 microns.

7. The filter apparatus of claim 1, wherein the support body comprises a glass, ceramic, or glass-ceramic.

8. The filter apparatus of claim 1, wherein the support body is essentially free of sulfur.

9. The filter apparatus of claim 1, wherein an organic antioxidant is distributed throughout the support body.

10. The filter apparatus of claim 1, wherein the organic antioxidant is ascorbic acid.

11. The filter apparatus of claim 1, wherein the organic antioxidant is ascorbic acid and glutathione.

12. The filter apparatus of claim 1, wherein the organic antioxidant is present in an amount from 0.1% to 50% by weight of the uncoated support body.

13. A method of treating a fluid stream comprising a toxic metal, the method comprising:
contacting a fluid stream with a filter apparatus comprising:
a honeycomb shaped support body;
an activated carbon layer on the support body; and
an organic antioxidant;
wherein the organic antioxidant is present as a solid phase;
wherein the organic antioxidant is present as an organic antioxidant layer and the activated carbon layer is sandwiched between the organic antioxidant layer and the support body; and
wherein the organic antioxidant is selected from ascorbic acid, glutathione, sodium ascorbate, calcium ascorbate, trans stilbene oxide, tetrakis-(methylene-(3,5-di-(tert)-butyl-4-hydrocinnamate)) methane, octadecyl 3,5-Di-(tert)-butyl-4-hydroxyhydrocinnamatelimonene, citrus oils, tocopherol, or combinations thereof,
inhibiting oxidation of sulfur compounds in the fluid stream; and
removing at least a portion of the toxic metal from the fluid stream.

14. The method of claim 13, wherein the fluid stream comprises a gas.

15. The method of claim 13, wherein the toxic metal is mercury.

* * * * *